(12) United States Patent
Neri et al.

(10) Patent No.: US 6,180,011 B1
(45) Date of Patent: *Jan. 30, 2001

(54) METHOD FOR REMOVING HYDROCARBON PRODUCTS FROM WATER SURFACES

(75) Inventors: Carlo Neri, San Donato Milanese; Silvestro Costanzi, Lodi Vecchio; Franco Groppelli, Lodi, all of (IT)

(73) Assignee: Enichem Synthesis S.p.A, Palermo (IT)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/876,440

(22) Filed: Jun. 16, 1997

Related U.S. Application Data

(63) Continuation of application No. 08/480,316, filed on Jun. 7, 1995, now abandoned, which is a continuation-in-part of application No. 08/223,734, filed on Apr. 6, 1994, now abandoned.

(30) Foreign Application Priority Data

Apr. 7, 1993 (IT) ................................ MI93A0693

(51) Int. Cl.⁷ ............................. C02F 1/28; C02F 101/32; C02F 103/08
(52) U.S. Cl. .......................... 210/692; 210/693; 210/924; 210/925
(58) Field of Search .................................. 210/691, 692, 210/693, 924, 925, 242.4

(56) References Cited

U.S. PATENT DOCUMENTS

| | | | | |
|---|---|---|---|---|
| 2,367,384 | * | 1/1945 | Tymstra et al. | 210/924 |
| 3,146,192 | | 8/1964 | McClintock | 210/693 |
| 3,147,216 | * | 9/1964 | Oemler | 210/693 |
| 3,378,507 | * | 4/1968 | Sargent et al. | 260/2.5 |
| 3,518,183 | * | 6/1970 | Evans | 210/924 |
| 3,617,566 | * | 11/1971 | Oshima | 210/282 |
| 3,674,683 | * | 7/1972 | Rainer | 210/DIG. 21 |
| 3,676,357 | * | 7/1972 | Ciuti et al. | 210/693 |
| 3,764,527 | | 10/1973 | Sohl | 210/693 |
| 3,770,627 | * | 11/1973 | Alquist et al. | 210/693 |
| 3,984,350 | * | 10/1976 | Karayannis et al. | 252/429 B |
| 4,015,060 | * | 3/1977 | Karayannis et al. | 526/141 |
| 4,072,809 | * | 2/1978 | Rogan | 526/136 |
| 4,111,836 | * | 9/1978 | Karayannis et al. | 252/429 B |
| 4,115,266 | * | 9/1978 | Ohshima | 210/80 |
| 4,317,898 | * | 3/1982 | Karayannis et al. | 526/141 |
| 4,454,198 | * | 6/1984 | Fickel et al. | 428/402 |
| 4,519,909 | * | 5/1985 | Castro | 210/500.2 |
| 4,524,000 | * | 6/1985 | Clayfield et al. | 210/649 |
| 4,563,259 | * | 1/1986 | Rayner | 524/99 |
| 4,666,763 | * | 5/1987 | King et al. | 428/221 |
| 4,684,726 | * | 8/1987 | Greco et al. | 544/69 |
| 4,785,034 | * | 11/1988 | Gaku et al. | 524/99 |
| 4,946,880 | * | 8/1990 | Costanzi et al. | 524/96 |
| 4,959,402 | * | 9/1990 | Williams et al. | 524/99 |
| 4,977,259 | * | 12/1990 | Greco et al. | 544/69 |
| 5,250,197 | * | 10/1993 | Marcel | 210/805 |
| 5,264,604 | * | 11/1993 | Neri et al. | 556/419 |
| 5,302,735 | * | 4/1994 | Neri et al. | 556/419 |
| 5,455,289 | * | 10/1995 | Caselli | 523/223 |
| 5,462,984 | * | 10/1995 | Neri et al. | 524/102 |

FOREIGN PATENT DOCUMENTS 0 044 052   1/1982   (EP) .
2 135207    8/1984   (GB) .

* cited by examiner

*Primary Examiner*—Cynthia L. Nessler
(74) *Attorney, Agent, or Firm*—Oblon, Spivak, McClelland, Maier & Neustadt, P.C.

(57) ABSTRACT

A method for removing hydrocarbon products from water surfaces, which entails contacting the hydrocarbon products with a crystalline polypropylene, which when observed under a microscope of 2500 magnetization, exhibits a spongy surface having relatively homogeneous intercommunicating pores, with dimensions of between about 3 μm and 20 μm in diameter.

20 Claims, 3 Drawing Sheets

METHOD FOR REMOVING HYDROCARBON PRODUCTS FROM WATER SURFACES

This application is a continuation of application Se. No. 08/480,316, filed Jun. 7, 1995, now abandoned, which is a continuation of application Ser. No. 08/223,734, filed Apr. 6, 1994, now abandoned.

FIELD OF THE INVENTION

The present invention relates to a method for removing hydrocarbon products from water surfaces.

More specifically the present invention relates to a method for removing hydrocarbon products from water surfaces such as the sea, rivers, lakes, basins, etc. with the use of polypropylene.

DESCRIPTION OF THE BACKGROUND

The pressing demand for petroleous products on the part of industrialized nations has made it necessary to transport considerable quantities of petroleum and its derivatives by sea.

The use of effective means of security, although reducing the risks of environmental pollution, does not however exclude the possibility of accidental dispersions in the sea of more or less vast quantities of petroleous products. These dispersions can be extremely harmful to the environment in that the hydrocarbon substances, which are lighter than water, tend to spread over vast areas, forming a layer on the surface of the water which prevents the exchange of oxygen with the atmosphere, consequently jeopardizing marine life. In addition, the pollution may also effect the coasts causing serious damage both to the ecological equilibrium of the beaches, and to human activities carried out on the coasts (for example harbour traffic and tourism).

The removal of hydrocarbon products dispersed in the water creates numerous difficulties, mainly due to the fact that the most volatile constituents evaporate whereas the heavier fractions tend to form a very viscous and sticky emulsion with the water, which is very difficult to recover with the conventional methods.

To resolve this problem it has been suggested to use absorbent materials which, when put in contact with liquid hydrocarbons, are capable of absorbing them making them easily recuperable.

The main characteristics which make an absorbent material suitable for this type of use are the following:

- great affinity with hydrocarbons and consequently high absorbing effect expressed as a quantity of oily substance absorbed per unit by weight of absorbent material;
- high surface development of the material to favour contact with the polluting product and consequently improve the absorbing effect;
- low specific weight, to guarantee that the material floats on the surface of the water both before and after impregnation with the oily substances;
- low degree of stickiness and good consistency of the material once this has absorbed the oily product, to facilitate its recovery;
- low cost of absorbent material, to guarantee the economy of the method;
- possibility of recycling the material after use to recover both the above material which can therefore be re-used for the same or different purposes, and the absorbed oily product.

Japanese patent JP 48005675 describes the use of a granular mixture containing pellets based on polypropylenic resin, saw-dust and graphite powder, to absorb oily products. After absorption, the above mixture is incinerated.

Japanese patent JP 49030282 discloses a multilayer polypropylene, not interlaced, useful for the removal of oily products.

Japanese patent JP 49053177 describes the use of bags filled with pieces of polypropylene foam (atactic) containing adjoining pores.

Japanese patent JP 57151717 describes absorbing products, which can be used for removing oily products, capable of floating where the floats are placed between sheets of absorbing material. These sheets can be made of synthetic or chemical fibres such as polyolefins, natural fibres, mineral fibres, etc. This patent also indicates the possible use of a combination of products which rapidly absorb and products which slowly absorb oily products such as, for example, polypropylene. In the products described in the known art the absorption of oily products is a consequence of the high surface area of the end-product. Consequently, one of the disadvantages of the products of the known art lies in the fact that the oily products absorbed are easily released from the end-product when it is withdrawn from the contaminated water surface or subjected to light pressure.

Other disadvantages of the methods described in the known art are the impossibility of re-using the products used for the same or different purposes and the low affinity of these with hydrocarbons with a consequently very limited absorbing effect.

SUMMARY OF THE INVENTION

The Applicant has now found a method for removing hydrocarbon products from water surfaces capable of overcoming the disadvantages of the known art, using a polypropylene characterized by a high absorbing effect and low specific weight which, after absorbing the hydrocarbon product, forms a mass with a limited stickiness, capable of floating on the surface of the water and being easily removed with the conventional mechanical methods.

DETAILED DESCRIPTION OF THE PREFERRED EMBODIMENT

Figure 1:
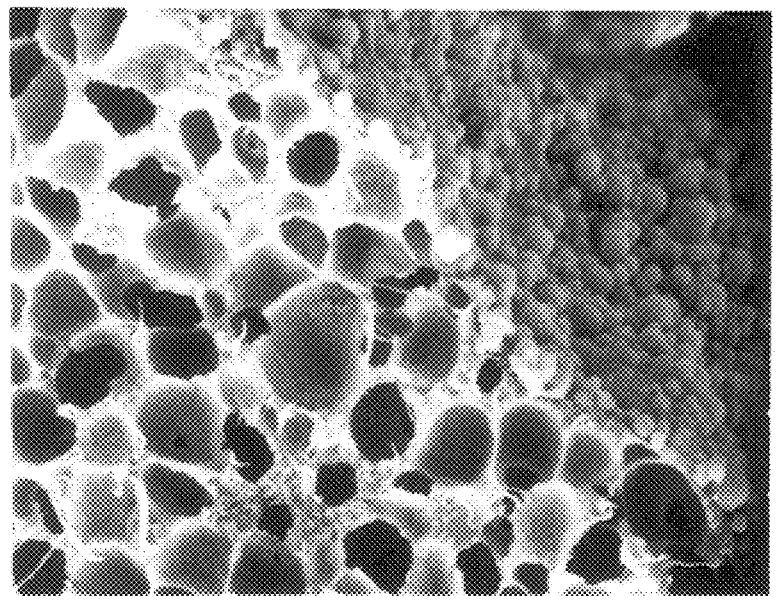
FIG. 1 illustrates the porous structure of a product obtained using a mixture of polypropylene/compounds with a ratio by weight of 1/9, respectively.

The present invention therefore relates to a method for removing hydrocarbon products from water surfaces which consists in putting said hydrocarbon products in contact with a porous polypropylene having the characteristics described above, obtained by a procedure which includes:

(a) mixing a polypropylene with at least one silicon compound having a sterically hindered amine group in the molecule;
(b) melting the above mixture at a temperature and for a time which is sufficient to form a single liquid phase;
(c) cooling the mixture until a solid is formed which is then reduced into the physical form desired;
(d) extracting the silicon compound from the above solid with a solvent.

Polypropylenes which can be used for the purposes of the present invention are all those obtained by polymerization in the presence of Ziegler-Natta catalysts: just as an example those produced by Himont and sold under the trade-name of Moplen, can be mentioned. Recycled polypropylenes or polypropylenes from waste of other processes can also be suitably used.

Among the silicon compounds having a sterically hindered amine group in the molecule used in step (a), particular importance should be given to those known under the trade-name of UVASIL of Enichem Synthesis.

UVASIL products are generally mixtures of cyclic products having general formula (I), and linear products having general formula (II):

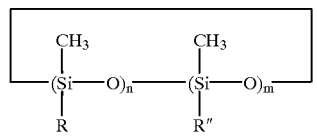
(I)

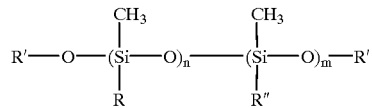
(II)

wherein:

R is a group having general formula (III):

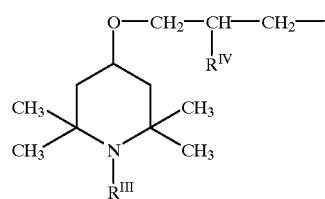
(III)

wherein:

$R^{III}$ is a hydrogen atom or a methyl;

$R^{IV}$ is a hydrogen atom or a $C_1$–$C_5$ alkyl radical, linear or branched;

R' is a hydrogen atom, a group having general formula (IV):

(IV)

or a $C_1$–$C_{12}$ alkyl radical, linear or branched;

R" is a $C_1$–$C_{18}$ alkyl radical, linear or branched, or one of the following radicals:

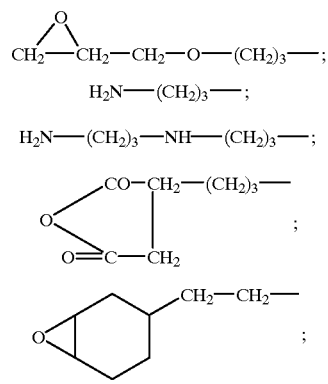

m+n have a value of between 3 and 6 in the case of products having general formula (I), of between 4 and 50 in the case of products having general formula (II);

m is 0 or an integer between 1 and 15.

General formulae (I) and (II) are generally present inside the silicon compound in relative quantities which vary according to the molecular weight to be obtained.

Preferred silicon compounds for the purposes of the present invention are cyclic products having the following general formula (V):

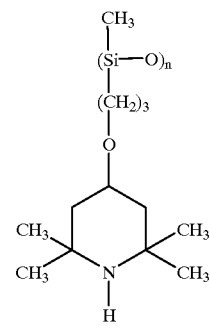
(V)

wherein n is an integer between 3 and 6.

Silicon copolymers are also used in step (a), having the following structural formulae (VI) and (VII):

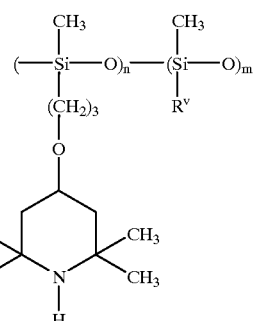
(VI)

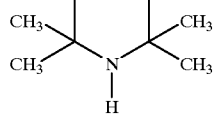

-continued

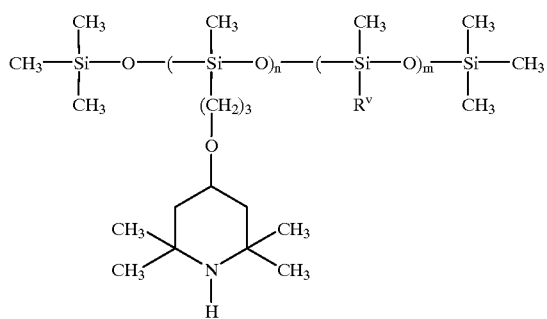
(VII)

wherein:
R$^V$ is a C$_1$–C$_{18}$ alkyl radical, linear or branched, preferably a linear alkyl radical having eight carbon atoms;
n+m have a value of between 3 and 60;
$1 \leq n/m \leq 4$.

In step (a) compounds can be used, mixed with the above UVASIL products, known under the trade-name of UVASEB having general formula (VIII):

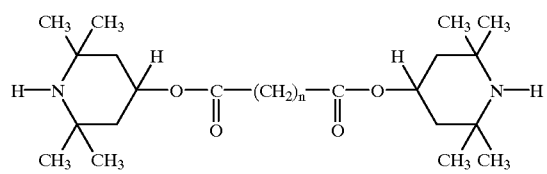
(VIII)

wherein n is an integer between 0 and 10.

Preferred compounds having formula (VIII) for the purposes of the present invention are those wherein n is an integer between 4 and 8.

Specific examples of preferred silicon compounds according to the present invention are:
tetramethyl-tetrapropyl-3-oxy-[4-(2,2,6,6-tetramethyl) piperidinyl]cyclotetrasiloxane (known under the trade-name of UVASIL 299 LM of Enichem Synthesis;
tetramethyl-di-n-octyl-dipropyl-3-oxy-[4-(2,2,6,6-tetramethyl)piperidinyl]cyclotetrasiloxane;
methyl-n-octyl (30%–35%) methylpropenyl-oxy-[4-(2,2,6,6-tetramethyl)piperidinyl] (65%–70%) terminated siloxanic copolymer trimethyl-silyl (known under the trade-name of UVASIL 8 of EniChem Synthesis).

A specific example of the preferred compound having general formula (VIII) according to the present invention is:
bis-(2,2,6,6-tetramethyl)-4-piperidinyl ester of sebacic acid (known under the trade-name of UVASEB 770 of EniChem Synthesis).

The silicon compounds used in step (a), either alone or mixed with compounds having formula (VIII), can be added to the polypropylene in a quantity of between 120% and 950%, preferably between 140% and 900% on the basis of the weight of the polypropylene.

In step (a) of the above procedure, the polypropylene (powder) and silicon compounds described above (liquid), either alone or mixed with compounds having formula (VIII), are charged into a reactor in the desired quantities and mixed.

In step (b) of the above procedure, the mixture obtained is brought to melting point at a temperature of between 170° C. and 280° C., preferably between 100° C. and 240° C. The above mixture is maintained under stirring for a time of between 10 and 120 minutes, preferably between 20 and 60 minutes to allow the polypropylene to melt and consequently form a single liquid phase with the stabilizing compound.

In step (c) of the above procedure, the mixture thus obtained is poured into a container such as, for example, an aluminium basin and left to cool to room temperature, for a period of between 10 and 30 minutes until a waxy-looking solid has formed. The solid is then ground and sieved, with suitable sieves as to obtain a powder having a particle size of between 0.1 mm and 1 mm in diameter.

In step (d) of the above procedure, the powder thus obtained is extracted using a Soxhlet-type extractor or a column equipped with a porous septum and heating jacket, in the presence of suitable solvents such as, for example, toluene, hexane, heptane, chloroform, ethanol, methanol, acetone, etc. Step (d) is carried out at a temperature of between 40° C. and the boiling point of the solvent provided that this does not exceed 85°C.

At the end of step (d), the compound or mixture of compounds added to the polypropylene, recovered after extraction, can be re-used for further preparations after removing the solvent by evaporation under vacuum the mixture being treated at a pressure of between 100 h Pa and 5 h Pa and a temperature of between 100° C. and 200° C., preferably between 120°C. and 160° C.

The polypropylene remaining after extraction is dried under vacuum by bringing it to a temperature of between 40° C. and 100° C. and at a pressure of between 100 h Pa and 5 h Pa.

The polypropylene thus obtained, observed under the microscope at 2500 magnifications (2500x), has a spongy surface with relatively homogeneous intercom municating pores having dimensions of between 3 $\mu$m and $\mu$m in diameter.

The dimensions and homogeneity of the pores depend to a great extent on the quantity of compounds (the term compounds refers to the silicon compounds having a sterically hindered amine group in the molecule, either alone or mixed with compounds having general formula (VIII), described above) used in step (a) of the procedure and on the cooling conditions to which the mixture is subjected in step (c).

Figure 2:
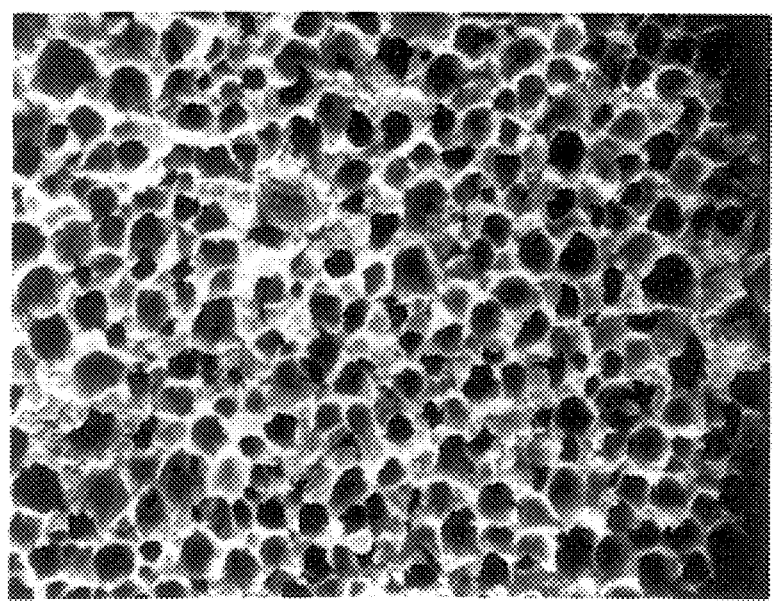
FIG. 2 illustrates the porous structure of a product obtained using a mixture of polypropylene/compounds with a ratio by weight of 1/2.3, respectively.

It has been observed that porous products obtained starting from a mixture of polypropylene/compounds with a ratio by weight of 1/9 respectively, are composed of heterogeneous pores with greater dimensions (FIG. 1) than those obtained starting from a mixture of polypropylene/compounds with a ratio by weight of 1/2.3 respectively (FIG. 2).

Figure 3:
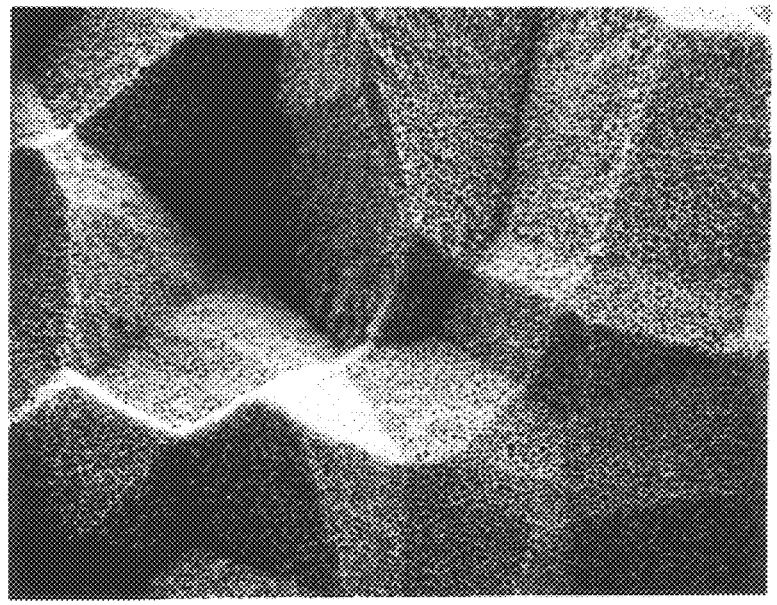
FIG. 3 illustrates the cleavage surface of a porous product obtained from a mixture of polypropylene/compounds with a ratio by weight of 1/2.3, respectively.
Figure 4:
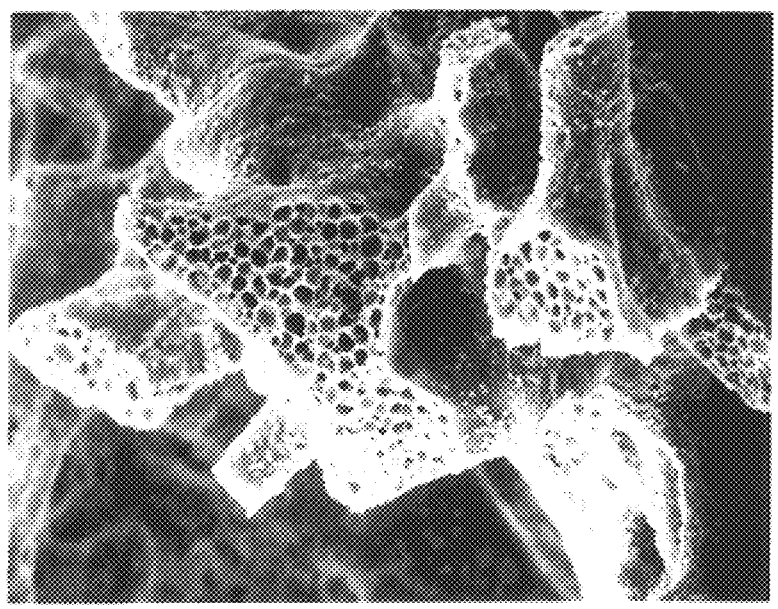
FIG. 4 illustrates the cleavage surface of a porous product obtained from a mixture of polypropylene/compounds with a ratio by weight of 1/9, respectively.

Considerable differences among products having different porosities are also observed at 300 magnifications (300x). In fact, at this magnification, the porous products obtained starting from a mixture of polypropylene/compounds with a ratio by weight of 1/2.3 respectively, are composed, at the cleavage surface, of numerous spherulites whose contact planes create a structure similar to that observed for crystalline products (FIG. 3), different from that observed in the case of porous products obtained starting from a mixture of polypropylene/compounds with a ratio by weight of 1/9 resepctively (FIG. 4).

This different aspect is also confirmed by calorimetric measurements (DSC) which show that the product obtained starting from a mixture of polypropylene/compounds with a ratio by weight of 1/2.3 respectively, has a crystallinity ranging from 65% to 75%, whereas the product obtained starting from a mixture of polypropylene/compounds with a ratio by weight of 1/9 respectively, have a crystallinity ranging from 25% to 35%. The percentage of crystallinity of the polypropylene is calculated according to the following formula:

$$\frac{\Delta H_m}{\Delta H_o} \times 100$$

wherein:
- $\Delta H_o$=melting enthalpy of the pure crystalline polypropylene (190 joule/g);
- $\Delta H_m$=melting enthalpy of the materials obtained according to the procedure described above.

Further differences between the products having different porosities relate to the density of the material and its mechanical consistency.

The density is in fact 0.09 g/cc for porous products obtained starting from a mixture of polypropylene/compounds with a ratio by weight of 1/9 which are moreover much more fragile and consequently more subject to slaking than porous products obtained starting from a mixture of polypropylene/compounds with a ratio by weight of 1/2.3 having a density of 0.25 g/cc.

As described above, the dimensions and homogeneity of the pores also depend on the cooling conditions to which the mixture is subjected in step (c).

In fact, the porous products described above can be obtained by subjecting the molten mass, obtained in step (b) of the procedure, to a cooling rate of between 5° C./minute and 50°C./minute or to a simple cooling to room temperature. Operating under these conditions, no significant difference in the size of the pores and other physical characteristics of the material was observed.

When, on the other hand, the molten mass, obtained in step (b) of the procedure, is suddenly cooled with a cooling rate of about 100° C./minute, a sticky solid is obtained, which, after extraction with solvents as described in step (d) of the procedure, does not present the microporous structures described above. In addition, from the calorimetric measurement (DSC), the polymer proves to be completely amorphous.

To increase the contact surface between the absorbing material and hydrocarbon product, the polypropylene is used in the form of powder with particles having a diameter of between 0.1 mm and 2.5 mm. The polypropylene can however be used in other forms such as, for example, flakes, drops, microspheres, slabs, etc. However it is preferable for the purposes of the present invention to use a polypropylene in powder form with particles having a diameter of between 0.1 mm and 1 mm which has a good absorbing rate of the hydrocarbon product.

The great affinity between the polypropylene thus obtained and the hydrocarbon product determines a high absorbing effect and consequently enables low weight ratios to be used between polypropylene and polluting product, of between 0.66 and 0.06, preferably between 0.42 and 0.11.

The polypropylene can be distributed on the surface polluted by the hydrocarbons with any suitable means which can guarantee that the distribution is as uniform as possible, the choice obviously depending on the size of the area to be cleaned. To obtain the maximum absorption, it is preferable to carry out the treatment before any solid bituminous agglomerations are formed, which would be very difficult to be absorbed with respect to the hydrocarbons in the liquid state.

The absorption of hydrocarbon products on the part of polypropylene which, as mentioned above depends on its physical form, is rapid and is generally completed in a period of seconds.

Once the hydrocarbon products have been absorbed, the polypropylene is in the form of a relatively non-sticky mass which can easily be collected by absorbing booms and recovered with the conventional mechanical means. The polypropylene used, unlike other commercial products, does not discharge the hydrocarbon product absorbed when subjected to slight pressure and does not dirty the containers with which it comes into contact. Once the mass has been collected, the polypropylene can be recovered by extraction using a Soxhlet type extractor. The operation can be carried out in continuous charging the polypropylene recovered into a column equipped with a porous septum and heating jacket, eluating with a suitable solvent such as, for example, toluene, hexane, heptane, chloroform, ethanol, methanol, acetone, gas oil, etc.

At the end of the extraction, the solvent is eliminated by drying the polypropylene under vacuum at a temperature of between 40° C. and 80° C. and at a pressure of between 100 h Pa and 10 h Pa or, by charging a flow of hot nitrogen into the column prepared as described above at a temperature of 80° C.

The morphology of the recovered polypropylene is unchanged upon microscopic observation with respect to that of the polypropylene which is not regenerated and no loss in effectiveness is observed during the subsequent absorption phases.

The following examples are illustrative but not restricting and provide a better understanding for the embodiment of the present invention.

EXAMPLE 1

Preparation of a Spongy Powder of Polypropylene Containing 70% of Voids 280 g of liquid silicon polymer composed of tetramethyl-tetrapropyl-3-oxy-4-[(2,2,6,6-tetramethyl)piperidinyl]cyclotetrasiloxane and 120 g of polypropylene powder of the type Moplen FLF 20 of Himont, having a MFI of 12 g/10' (ASTM D1238L) and a density of 0.9 g/cc are charged into a reactor equipped with a stirrer.

The mixture is brought to a temperature of 220° C. and is kept at this temperature for about 30 minutes thus allowing the polypropylene to melt and form a single liquid phase with the silicon polymer.

The mixture is subsequently discharged from the reactor, poured into an aluminium basin and left to cool to room temperature. The cooling time is about 20 minutes.

The solid product thus obtained, having a waxy and friable appearance, is ground and sieved with suitable sieves as to obtain a powder having a particle size of between 0.1 mm and 0.5 mm in diameter.

200 g of the above powder are charged onto a Soxhlet-type extractor and extracted using hot toluene, at a temperature of 110° C., as extraction solvent.

After about 5 hours, the silicon polymer is completely extracted and can be re-used for further preparations after removing the solvent by evaporation under vacuum, at a temperature of 120° C. and at a pressure of 75 h Pa.

The polypropylene obtained after extraction is dried under vacuum at a temperature of 70° C. and at a pressure of 100 h Pa.

After drying, 59 g of polypropylene powder, equal to 98.3% of the estimated amount, are recovered.

Upon microscopic observation (2500×), the polypropylene has a spongy surface with intercommunicating pores having dimensions of 3–6 μm (see FIG. 2).

The polypropylene, which is highly crystalline, has the following characteristics:

melting point: 170° C.–172° C.;

ΔH of melting: 115–120 joule/g;

MFI: 20–22 g/10';

bulk density: 0.29 g/cc;

density of the powder having a diameter of 0.1–0.5 mm: 0.14 g/cc;

quantity of voids: 70%±2%.

EXAMPLE 2
Preparation of a Spongy Powder of Polypropylene Containing 70% of Voids 280 g of liquid silicon polymer composed of tetramethyl-tetrapropyl-3-oxy-4-[(2,2,6,6-tetramethyl)piperidinyl]cyclotetrasiloxane and 120 g of polypropylene powder of the type Moplen FLF 20 of Himont, having a MFI of 12 g/10' (ASTM D1238L) and a density of 0.9 g/cc are charged into a reactor equipped with a stirrer.

The mixture is brought to a temperature of 220° C. and is kept at this temperature for about 30 minutes thus allowing the polypropylene to melt and form a single liquid phase with the silicon polymer.

The mixture is subsequently discharged from the reactor, poured into an aluminium basin and left to cool to room temperature. The cooling time is about 10 minutes.

The solid product thus obtained, having a waxy and friable appearance, is ground and sieved with suitable sieves as to obtain a powder having a particle size of between 0.1 mm and 0.5 mm in diameter.

250 g of the above powder are charged onto a glass extraction column equipped with a porous septum and heating jacket in which heated water is circulated at a temperature of 50° C.

750 cc of toluene are poured through the powder from the top of the column over a period of about 2 hours. The liquid leaving the column is collected and the toluene is evaporated using the same procedure as in example 1, thus recovering the silicon polymer.

The polypropylene powder remaining in the column can be dried by stripping the toluene under vacuum at a temperature of 70° C. and at a pressure of 100 h Pa.

After drying, 73 g of polypropylene powder are recovered, equal to 97.5% of the estimated amount, having the same characteristics as shown in example 1.

EXAMPLE 3
Preparation of a Spongy Powder of Polypropylene Containing 85% of Voids 212 g of liquid silicon polymer composed of tetramethyl-di-n-octyl-dipropyl-3-oxy-4-[(2,2,6,6-tetramethyl)piperidinyl]cyclotetrasiloxane and 38 g of polypropylene powder of the type Moplen FLF 20 of Himont, having a MFI of 12 g/10' (ASTM D1238L) and a density of 0.9 g/cc are charged into a flask equipped with a stirrer.

The mixture is brought to a temperature of 220° C. and is kept at this temperature for about 30 minutes thus allowing the polypropylene to melt and form a single liquid phase with the silicon polymer.

The mixture is subsequently discharged from the flask, poured into an aluminium basin and left to cool to room temperature. The cooling time is about 20 minutes.

The solid product thus obtained, having a waxy and friable appearance, is ground and sieved with suitable sieves to obtain a powder having a particle size of between 0.1 mm and 0.5 mm in diameter.

200 g of the above powder are charged onto a glass extraction column equipped with a porous septum and heating jacket in which heated water is circulated at a temperature of 50°C.

600 cc of toluene are poured through the powder from the top of the column over a period of about 2 hours. The liquid leaving the column is collected and the toluol is evaporated using the same procedure as in example 1, thus recovering the silicon polymer.

The polypropylene powder remaining in the column can be dried by stripping the toluene under vacuum at a temperature of 70° C. and at a pressure of 100 h Pa.

After drying, 31 g of polypropylene powder are recovered, equal to 15.5% of the amount charged.

Figure 5:
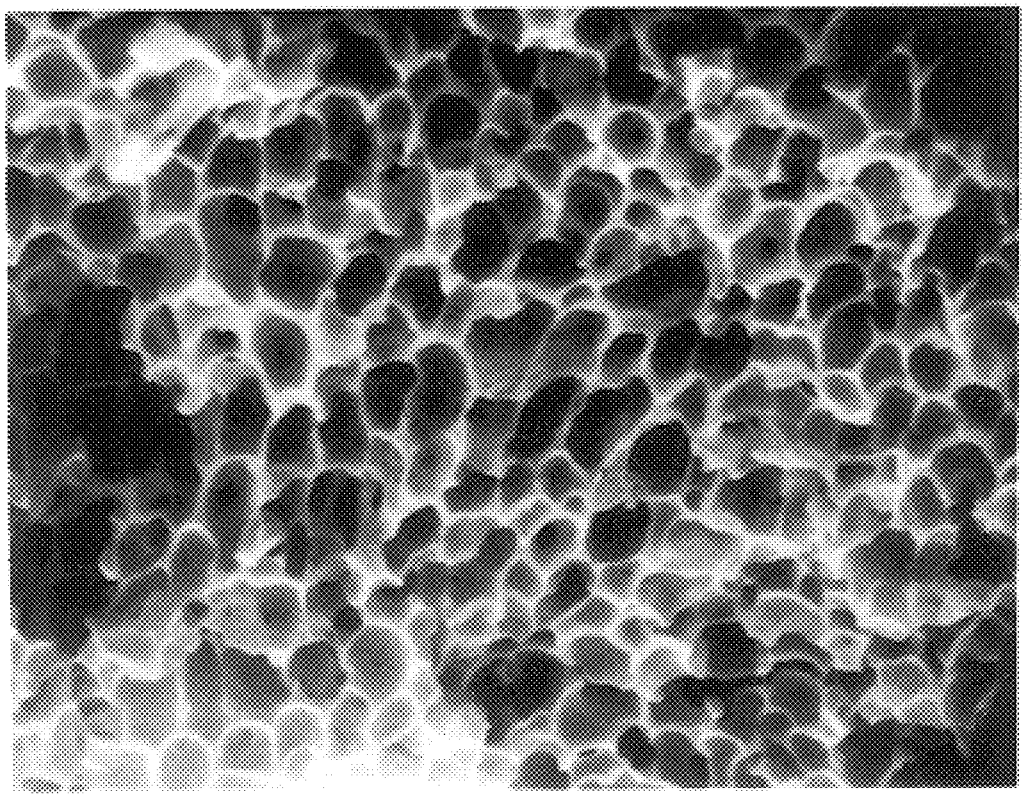
FIG. 5 illustrates the spongy surface of the present polypropylene having intercommunicating pores.

Upon microscopic observation (2500x), the polypropylene has a spongy surface with intercommunicating pores having dimensions of 3–5 μm (see FIG. 5).

The polypropylene, which is highly crystalline, has the following characteristics:

melting point: 172° C.–173° C.;

ΔH of melting: 115 joule/g;

MFI: 20 g/10';

bulk density: 0.14 g/cc;

density of the powder having a diameter of 0.1–0.5 mm: 0.11 g/cc;

quantity of voids: 85%±2%.

EXAMPLE 4
Preparation of a Spongy Powder of Polypropylene Containing 85% of Voids 150 g of liquid silicon polymer composed of tetramethyl-tetrapropyl-3-oxy-4-[(2,2,6,6-tetramethyl)piperidinyl]cyclotetrasiloxane, 62 g of bis-(2,2,6,6-tetramethyl)-4-piperidinyl ester of sebaic acid and 38 g of polypropylene powder of the type Moplen FLF 20 of Himont, having a MFI of 13.2 g/10' (ASTM D1238L) and a density of 0.9 g/cc are charged into a flask equipped with a stirrer.

The mixture is brought to a temperature of 200° C. and is kept at this temperature for about 30 minutes thus allowing the polypropylene to melt and form a single liquid phase with the silicon polymer.

The mixture is subsequently discharged from the flask, poured into an aluminium basin and left to cool to room temperature. The cooling time is about 15 minutes.

The solid product thus obtained, having a waxy and friable appearance, is ground and sieved with suitable sieves to obtain a powder having a particle size of between 0.1 mm and 0.5 mm in diameter.

200 g of the above powder are charged onto a Soxhlet-type extractor and extracted using toluene as extraction solvent.

After about 5 hours, the above liquid polymers are completely extracted and can be re-used for further preparations after removing the solvent by evaporation under vacuum, at a temperature of 120°C. and at a pressure of 75 h Pa.

The polypropylene obtained after extraction is dried under vacuum at a temperature of 70°C. and at a pressure of 100 h Pa.

After drying, 29.3 g of polypropylene powder are recovered, equal to 14.6% of the amount charged, and having the same characteristics described in example 3.

EXAMPLE 5
Preparation of a Spongy Powder of Polypropylene Containing 90% of Voids 80 g of liquid silicon polymer composed of tetramethyl-di-n-octyl-dipropyl-3-oxy-4-[(2,2,6,6-tetramethyl)

piperidinyl]cyclotetrasiloxane, 100 g of bis-(2,2,6,6-tetramethyl)-4-piperidinyl ester of sebacic acid and 20 g of polypropylene powder of the type Moplen FLF 20 of Himont, having a MFI of 12.5 g/10' (ASTM D1238L) and a density of 0.9 g/cc are charged into a reactor equipped with a stirrer.

The mixture is brought to a temperature of 180° C. and is kept at this temperature for about 1 hour thus allowing the polypropylene to melt and form a single liquid phase with the silicon polymer.

The mixture is subsequently discharged from the reactor, poured into an aluminium basin and left to cool to room temperature. The cooling time is about 30 minutes.

The solid product thus obtained, having a waxy and friable appearance, is ground and sieved with suitable sieves to obtain a powder having a particle size of between 0.1 mm and 0.5 mm in diameter.

180 g of the above powder are charged onto a glass extraction column equipped with a porous septum and heating jacket in which heated water is circulated at a temperature of 50° C.

600 cc of toluene are poured through the powder from the top of the column over a period of about 2 hours. The liquid leaving the column is collected and the toluene is evaporated under vacuum, at a temperature of 120° C. and a pressure of 13 h Pa. In this way 161 g of silicon powder and ester of sebacic acid are recovered.

The polypropylene powder remaining in the column is dried by stripping the toluol under vacuum at a temperature of 70° C. and at a pressure of 100 h Pa.

After drying, 18.3 g of polypropylene powder are recovered, equal to 10.2% of the amount charged.

Upon microscopic observation (2500×), the polypropylene has a spongy surface with intercommunicating pores having dimensions of 3–20 μm (see FIG. 1).

The polypropylene has the following characteristics:

melting point: 170° C.–172° C.;

ΔH of melting: 25 joule/g;

MFI: 17.5 g/10';

bulk density: 0.1 g/cc;

density of the powder having a diameter of 0.1–0.5 mm: 0.08 g/cc;

quantity of voids: 90%±2%.

EXAMPLE 6
Preparation of Spongy Cylindrical Solids of Polypropylene Containing 90% of Voids 80 g of liquid silicon polymer composed of tetramethyl-di-n-octyl-dipropyl-3-oxy-4-[(2,2,6,6-tetramethyl)piperidinyl]cyclotetrasiloxane, 100 g of bis-(2,2,6,6-tetramethyl)-4-piperidinyl ester of sebacic acid and 20 g of polypropylene powder of the type Moplen FLF 20 of Himont, having a MFI of 12.5 g/10' (ASTM D1238L) and a density of 0.9 g/cc are charged into a reactor equipped with a stirrer.

The mixture is brought to a temperature of 180° C. and is kept at this temperature for about 1 hour thus allowing the polypropylene to melt and form a single liquid phase with the silicon polymer.

The mixture is subsequently discharged from the reactor, poured into a cylindrical-shaped container and left to cool to room temperature. The cooling time is about 30 minutes.

The solid product thus obtained, is extracted with toluol using a Soxhlet-type extractor using the same procedure described in the previous examples.

After drying under vacuum, the cylindrical-shaped solid weighs 19 g and has a density of 0.11 g/cc.

EXAMPLES 7–8
Preparation of Spongy Powders of Polypropylene Containing 90% of Voids Using the same procedure described in example 5, porous polypropylene powders were obtained containing 85% of voids starting from polypropylene powder of Himont of the type Moplen FLS 30 and Moplen FLZ 30S having the MFI (g/10) and densities (g/cc) shown in Table 1.

TABLE 1

| Example N° | Polypropylene type | MFI (g/10') (ASTM D 1238L) | Density (g/cc) |
| --- | --- | --- | --- |
| 7 | FLS30 | 1.5 | 0.9 |
| 8 | FLZ30S | 25 | 0.9 |

EXAMPLE 9
Use of the Spongy Powders as Absorbents of Petroleum Dispersed in Water (9a) 0.5 lt of distilled water and 83 g of crude oil obtained from the drilling of oil wells are placed in a 1 lt. crystallizer. 17 g of porous polypropylene powder, containing 90% of voids, prepared as described in example 3 are added onto the oily stain which is formed.

After about 30 seconds, the oily stain is completely absorbed by capillarity by the polypropylene powder which can be removed from the water by filtration on a porous glass septum of the type G2.

The quantity of oil absorbed is equal to about 5 times the weight of the polypropylene dust used.

(9b) Example (9a) is repeated using sea water to obtain the same results described above.

(9c–9d) Using the same procedure described in example (9a), powders are used prepared as described in examples 1 (containing 70% of voids) and 5 (containing 90% of voids).

In this way it was possible to absorb by capillarity a quantity of oil which is directly proportional to the percentage of voids of the powder and equal respectively to 3 and 8 times the weight of the powder used. In all cases the quantity of total organic carbon (TOC) present in the water, after removing the powders soaked with oil, was lower than 1 ppm.

EXAMPLE 10
Use of Spongy Powders as Absorbents of Gas Oil Emulsified with Water 300 g of an emulsion composed of 48% by weight of water, 50% by weight of gas oil and 2% by weight of non-ionic emulsifying agents are passed inside a column filled with 50 g of porous polypropylene powder containing 85% of voids, prepared as described in example 4.

During the passage, the water is percolated and the gas oil is withheld in the column. The aqueous liquid is limpid and upon analysis proves to have a content of organic carbon (TOC) of 3–5 ppm.

EXAMPLE 11
Method for the Extraction of Mineral Oil and Regeneration of the Porous Polypropylene Powder (11a) 50 g of porous polypropylene powder soaked with oil obtained as described in example (9a), are placed in a Soxhlet-type extractor and extracted for about 8 hours using toluene as extraction solvent.

At the end of the extraction, the polypropylene powder remaining in the thimble are treated under vacuum at a temperature of 50° C. and at a pressure of 50 h Pa.

After drying, 9 g of polypropylene powder are recovered.

11b) 50 g of porous polypropylene powder soaked with oil obtained as described in example (9a), are placed in a glass column with a porous septum equipped with a heating jacket. About 150 cc of toluene are poured in from the top of the column at a rate of 50 cc/h keeping the powder heated by using a passage of water at 50° C. in the heating jacket.

After 3 hours, the excess toluene is eliminated from the column by a light flow of nitrogen. The polypropylene powder is then dried under vacuum at a temperature of 50° C. and a pressure of 50 h Pa.

After drying, 8.7 g of polypropylene powder are recovered.

EXAMPLE 12

Recycling of Regenerated Spongy Polypropylene Powder 50 g of spongy polypropylene powder containing 70% of voids, obtained as described in example 1 was used for 10 times as an oil absorbent using the procedure described in example (9a) and was subjected to 10 subsequent regenerations as described in example (11b).

No loss in efficiency was observed during the absorption phases and the morphology of the polypropylene powder proved to be unaltered upon micro- scopic observation compared to that of polypropylene powder not yet used as an absorbent for hydrocarbons.

What is claimed is:

1. A method for removing hydrocarbon products from water surfaces, which comprises contacting said hydrocarbon products with a powdered, crystalline polypropylene, said polypropylene having an absorbency for hydrocarbon products such that a weight ratio of polypropylene/hydrocarbon products is between about 0.06 and 0.66, which when observed under a microscope of 2,500× magnification, exhibits a spongy surface having relatively homogeneous intercommunicating pores with dimensions of between about 3 μm and 20 μm in diameter, said crystalline polypropylene being produced by a process comprising:

a) mixing a polypropylene with at least one silicon compound containing a sterically hindered amine group, to form a mixture;

b) melting the above mixture at a temperature and for a time sufficient to form a single liquid phase;

c) cooling the mixture until a solid is formed; and d) extracting the at least one silicon compound from the above solid with a solvent.

2. The method for removing hydrocarbon products from water surfaces of claim 1, wherein in step (a) the silicon compounds are cyclic products having the following formula (V):

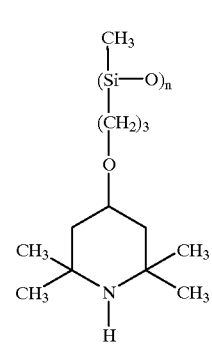

wherein n is an integer between 3 and 6.

3. The method for removing hydrocarbon products from water surfaces of claim 1, wherein in step (a) the silicon compounds are selected from silicon copolymers having the following structural formulae (VI) and (VII):

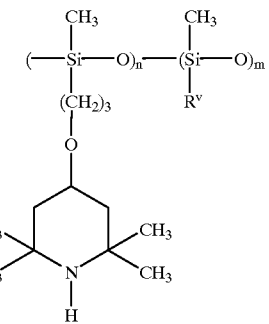

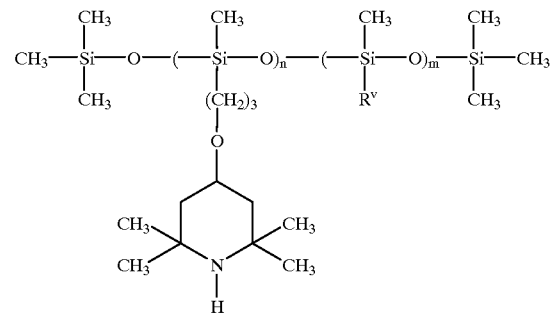

wherein:

$R^v$ is a $C_1$–$C_{18}$ alkyl radical, linear or branched;

n+m have a value of between 3 and 60; and $1 \leq n/m \leq 4$.

4. The method for removing hydrocarbon products from water surfaces of claim 1, wherein in step (b), the mixture obtained in step (a) is brought to melting point at a temperature of between 170° C. and 280° C. and is kept under stirring for a time of between 10 and 120 minutes.

5. The method for removing hydrocarbon products from water surfaces of claim 1, wherein in step (c), the mixture obtained in step (b), is left to cool to room temperature, for a time of between 10 and 30 minutes until a waxy-looking solid is formed which is subsequently ground and sieved to obtain a powder having a particle size of between 0.1 mm and 1 mm in diameter.

6. The method for removing hydrocarbon products from water surfaces of claim 1, wherein the polypropylene is used in the form of flakes, drops, microspheres or slabs.

7. The method for removing hydrocarbon products from water surfaces of claim 1, wherein the weight ratio between polypropylene and hydrocarbon product is between 0.42 and 0.11.

8. The method for removing hydrocarbon products from water surfaces of claim 1, wherein the polypropylene used is recycled polypropylene or polypropylene from waste of other processes.

9. The method of claim 1, wherein said silicon compound is selected from the group consisting of tetramethyl-tetrapropyl-3-oxy(4-(2,2,6,6-tetramethyl)piperidinyl)cyclotetrasiloxane, tetramethyl-di-n-octyl-dipropyl-3-oxy-(4-(2,2,6,6-tetramethyl)piperidinyl)cyclotetrasiloxane and bis-(2,2,6,6-tetramethyl)-4-piperidinyl ester of sebacic acid.

10. The method for removing hydrocarbon products from water surfaces of claim 1, wherein said crystalline polypropylene has a crystallinity of from 65 to 75%.

11. The method for removing hydrocarbon products from water surfaces of claim 1, wherein said crystalline polypropylene has a crystallinity of from 25 to 35%.

12. The method for removing hydrocarbon products from water surfaces of claim 1, wherein said crystalline polypropylene has a density of from 0.09 g/cc to 0.25 g/cc.

13. The method for removing hydrocarbon products from water surfaces of claim 1, wherein in step (d), the powder obtained in step (c) is extracted in the presence of solvents, at a temperature of between 40° C. and the boiling point of the solvent provided that this does not exceed 85° C.

14. The method for removing hydrocarbon products from water surfaces of claim 13, wherein the solvents are selected from the group consisting of toluene, hexane, heptane, chloroform, ethanol, methanol and acetone.

15. The method for removing hydrocarbon products from water surfaces of claim 1, wherein the polypropylene is used in the form of powder with particles having a diameter of between 0.1 mm and 2.5 mm.

16. The method for removing hydrocarbon products from water surfaces of claim 15, wherein the polypropylene is used in the form of powder with particles having a diameter of between 0.1 mm and 1 mm.

17. The method for removing hydrocarbon products from water surfaces of claim 1, wherein in step (a) the silicon compounds are used in a mixture with compounds having the formula (VIII):

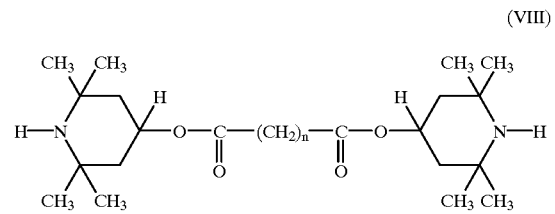

wherein n is an integer between 0 and 10.

18. The method of claim 17, wherein n is an integer between 4 and 8.

19. The method for removing hydrocarbon products from water surfaces of claim 17, wherein in step (a) the silicon compounds are added to the polypropylene in a quantity of between 120% and 950%, either alone or mixed with compounds having the formula (VIII).

20. The method for removing hydrocarbon products from water surfaces of claim 19, wherein in step (a) the silicon compounds are added to the polypropylene in a quantity of between 140% and 900%, on the basis of the weight of the polypropylene, either alone or mixed with compounds having the formula (VIII).

* * * * *